March 4, 1952     C. W. HALL     2,587,842
ROTARY VALVE WITH LIQUID FUEL INJECTION PORT
Filed Nov. 28, 1949
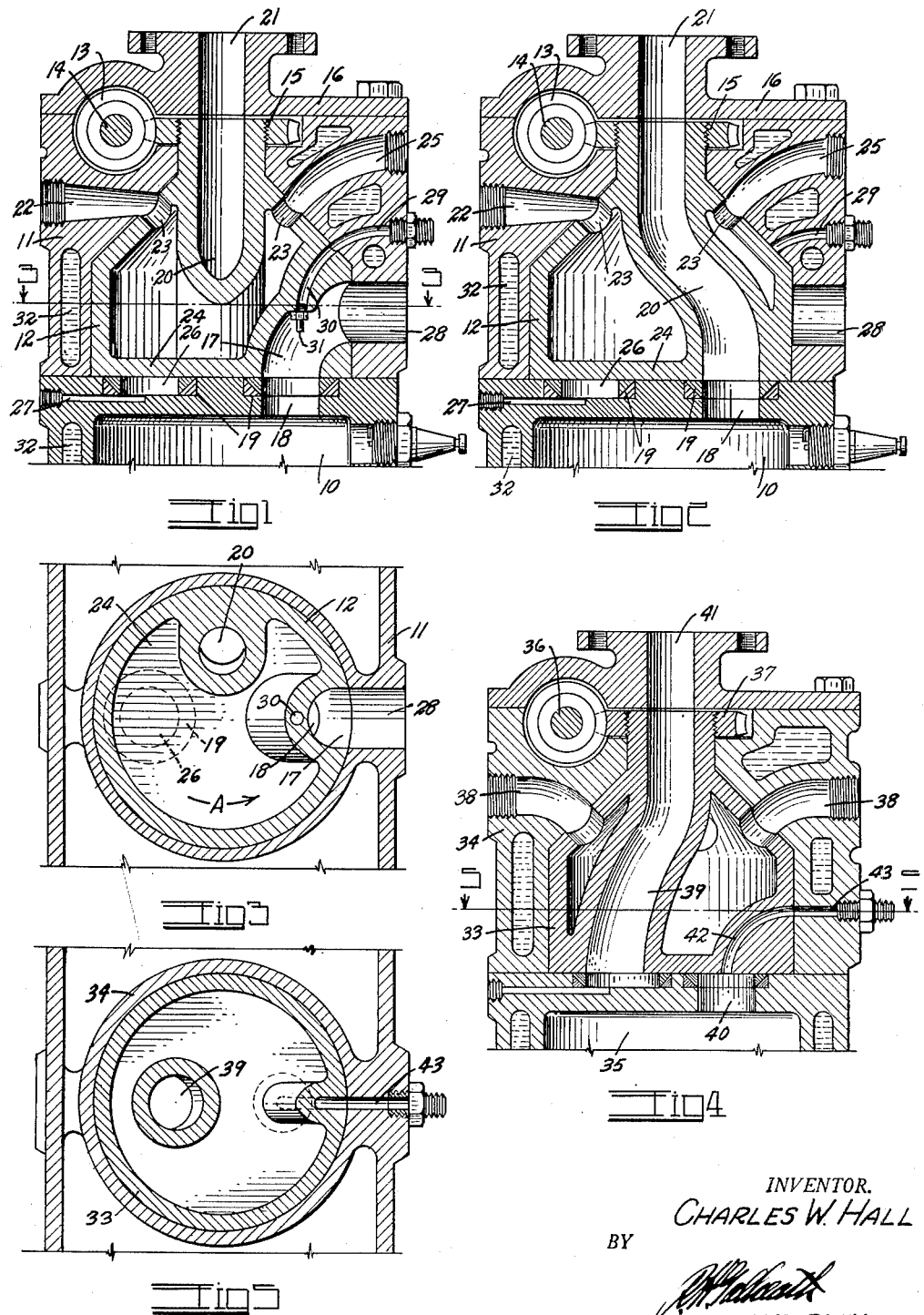
INVENTOR.
CHARLES W. HALL
BY
ATTORNEY Patented Mar. 4, 1952

2,587,842

UNITED STATES PATENT OFFICE 2,587,842

ROTARY VALVE WITH LIQUID FUEL INJECTION PORT

Charles W. Hall, Denver, Colo., assignor to M. S. Losey, Lakewood, Colo.

Application November 28, 1949, Serial No. 129,768

3 Claims. (Cl. 123—80)

This invention relates to a rotary valve for internal combustion engines. One of the difficulties encountered in the use of rotary valves on internal combustion engines results from overheating the intake gases as they pass through the valve so that they are too greatly expanded when they enter the engine cylinder. Another difficulty results from over-heating of the rotary valve itself which makes sealing difficult and often results in seizure of the valve.

The principal object of this invention is to provide a rotary valve which will be air cooled and in which the length of travel of the intake gas through the valve will be exceedingly short so as to prevent over-heating of the gas.

Another object of the invention is to combine with a rotary valve for internal combustion engines a port whereby liquid fuel may be injected into the combustion chamber at the proper time for ignition purposes so as to enable a single valve to be used for controlling the cylinder gases and the liquid fuel as used in injector and Diesel type engines.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical section through the head of a four-cycle internal combustion engine cylinder illustrating the improved valve in place therein in the "intake" cycle;

Fig. 2 is a similar view illustrating the rotary valve in the "exhaust" cycle position;

Fig. 3 is a horizontal section, taken on the line 3—3, Fig. 1;

Fig. 4 is a vertical section through the head of a two-cycle internal combustion engine illustrating an alternate form of the improved valve in the fuel injection cycle; and Fig. 5 is a horizontal section, taken on the line 5—5, Fig. 4.

The first form of the invention, as illustrated in Figs. 1, 2 and 3, is designed for use on four-cycle engines. In the latter figures, the upper portion of an engine cylinder is illustrated at 10 with a valve housing 11 mounted thereon. The cylinder 10 and the valve housing 11 are provided with suitable water jackets 32 for cooling purposes. The engine, of course, may have as many of the cylinders 10 as desired. All cylinders are similar and the description will refer to but a single cylinder.

A rotary valve 12 is mounted in the valve housing 11 over the cylinder 10. The valve 12 may be rotated in any desired manner at one-half crank shaft speed. As illustrated, the valve is rotated from a worm 13 on a valve shaft 14 which meshes with a worm gear 15 formed on the upper extremity of the valve. The worm 13 and the valve are covered by means of a cap plate 16.

The valve 12 is hollow, the lower portion thereof is cylindrical and the upper portion is conical. The bottom of the valve is closed by a flat bottom plate 24. An intake passage 17 communicates from the cylindrical wall thereof through the flat bottom plate thereof. The position of the intake passage in the flat bottom plate is eccentric of the axis of the valve so that at each revolution of the latter, the passage will register with a cylinder port 18 opening to the cylinder 10. A laterally expansible sealing ring 19 surrounds the cylinder port 18 and seals the latter to the flat bottom of the valve.

An exhaust passage 20 is also formed in the valve 12 extending from an eccentric position on the valve bottom to an axial position at the valve top. The lower extremity of the exhaust passage 20 registers with the cylinder port 18 once at each revolution of the valve 12. The upper extremity of the exhaust passage 20 is in constant communication with an axially positioned exhaust port 21.

It can be seen that when the valve is rotated in the direction of the arrow A in Fig. 3, gas will be drawn into the cylinder 10 on the intake stroke. The valve will then move so that the bottom thereof will close the port 18 for the compression and explosion strokes. As the piston returns on the exhaust cycle, the exhaust passage 20 will be registered with the cylinder port 18, as shown in Fig. 2, allowing the exhaust gases to flow through the exhaust passage 20 and the port 21.

The valve is provided with cooling air ports 23 which register with an air intake passage 22 and an air discharge passage 25 in the valve housing. Cooled air is forced into the intake passage 22, thus, constantly supplying fresh cooling air through the interior of the valve.

The valve is lubricated by means of a laterally expansible lubricating ring 26 which is positioned against the bottom thereof opposite to the sealing ring 19 to assist the latter in forcing the rotary valve upward against its conical seat. Lubricating oil is furnished to the ring 26 by means of an oil passage 27.

The valve as thus described would function on any four-cycle internal combustion engine to which fuel gas is supplied. For use on liquid fuel injection engines, air would be intaken through an intake port 28 and passage 17. Liquid combustion fuel is then supplied through a fuel port 29 which registers with a fuel passage 30 in the valve 12. The passage 30 leads to a fuel nozzle 31 in the intake passage 17. The port 29 is connected to any source of liquid fuel under pressure. The amount of fuel injected would be determined by the pressure thereon and by the time interval necessary for the passage 30 to close the port 29.

The same principle can be applied to a two-cycle engine, as shown in Figs. 4 and 5, in which a rotary valve 33 is mounted in a valve housing 34 on an engine cylinder 35. The valve may be driven in any desired manner at crank shaft speed. As illustrated, it is driven from a worm shaft 36 and worm gear 37 similarly to the previously described form. The valve may also be cooled by means of air ports 38 similarly to the previously described form.

In the two-cycle form, however, the valve 33 does not have an intake passage, it is provided with an exhaust passage 39 which registers once at each revolution of the engine crank shaft with a cylinder port 40. The upper extremity of the passage 39 is in constant communication with an exhaust port 41. A fuel passage 42 is formed in the valve 33 and extends from an eccentric position on the bottom of the valve to a position on the cylindrical wall thereof where it registers with a fuel port 43 in the valve housing 34. When the fuel passage 42 is in communication with the fuel port 43, it is also in communication with the cylinder port 40 and this position corresponds to the completion of the compression cycle of the engine.

Thus, when the air in the cylinder 35 is at its highest compression, fuel is injected therein for ignition and explosion purposes. The passage 42 then immediately moves from the port 43 for the explosion cycle and the exhaust passage 39 moves into alignment with the port 40 for the exhaust cycle. The air is intaken as is usual in two-cycle engines, either through a piston port or a piston controlled port from the crank case or from a source of pressure (not shown).

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A rotary valve for internal combustion engines comprising: a hollow rotary valve having a cylindrical lower portion terminating in a conical upper portion with a flat bottom in the lower portion; and exhaust passage extending from an eccentric position on said bottom to an axial position at the apex of said conical top; annular means surrounding said apex for imparting rotation to said valve; an intake passage extending from an eccentric position on said bottom to a position on the peripheral wall of said valve; and a liquid fuel passage extending from a position on the conical surface of said valve to a discharge orifice within said intake passage.

2. A rotary valve for internal combustion engines comprising: a hollow rotary valve having a cylindrical lower portion terminating in a conical upper portion with a flat bottom in the lower portion; an exhaust passage extending from an eccentric position on the bottom of said valve to a concentric position at the apex of the conical portion of said valve; and a liquid fuel passage extending from a position on the circumferential surface of said valve and communicating eccentrically through the flat bottom of said valve.

3. A rotary valve construction for an internal combustion engine cylinder comprising: a closure at the extremity of said cylinder having a cylinder port position eccentrically of the axis of said cylinder; a rotary valve positioned over and coaxially with said cylinder; an exhaust passage in said valve extending from an eccentric position on the lower surface thereof to a concentric position at the upper surface thereof; a fuel passage in said valve extending from an eccentric position on the lower surface thereof to a position on the cylindrical wall thereof, the eccentricity of said exhaust and fuel passages being such that they will register with said cylinder port once during each revolution of said valve; a head enclosing said valve; a fuel port formed in said head and positioned to register with said fuel passage; and means for receiving the exhaust from the concentric extremity of said exhaust passage.

CHARLES W. HALL.

REFERENCES CITED

The following references are of record in the file of this patent:

UNITED STATES PATENTS

| Number | Name | Date |
|---|---|---|
| 1,206,067 | Well | Nov. 28, 1916 |
| 2,369,566 | Hall | Feb. 13, 1945 |
| 2,387,972 | Aspin | Oct. 30, 1945 |
| 2,412,261 | Hall | Dec. 10, 1946 |
| 2,427,270 | Frank et al. | Sept. 7, 1947 |